(12) United States Patent
Marathe et al.

(10) Patent No.: US 9,594,786 B2
(45) Date of Patent: Mar. 14, 2017

(54) APPEND-ONLY B-TREE CURSOR

(71) Applicants: Nandan Marathe, Pune (IN); Blaine French, Concord, MA (US)

(72) Inventors: Nandan Marathe, Pune (IN); Blaine French, Concord, MA (US)

(73) Assignee: SYBASE, INC., Dublin, CA (US)

( * ) Notice: Subject to any disclaimer, the term of this patent is extended or adjusted under 35 U.S.C. 154(b) by 423 days.

(21) Appl. No.: 14/155,315

(22) Filed: Jan. 14, 2014

(65) Prior Publication Data

US 2015/0199391 A1    Jul. 16, 2015

(51) Int. Cl.
G06F 17/30 (2006.01)

(52) U.S. Cl.
CPC .. G06F 17/30327 (2013.01); G06F 17/30961 (2013.01)

(58) Field of Classification Search
CPC ......... G06F 17/30327; G06F 17/30961; G06F 17/30625
USPC ........................................................ 707/743
See application file for complete search history.

(56) References Cited

U.S. PATENT DOCUMENTS

| | | | | |
|---|---|---|---|---|
| 6,480,849 | B1 * | 11/2002 | Lee | G06F 17/30592 |
| 6,484,172 | B1 * | 11/2002 | Lee | G06F 17/30327 |
| 6,792,432 | B1 * | 9/2004 | Kodavalla | G06F 17/30348 |
| 7,363,284 | B1 * | 4/2008 | Plasek | G06F 17/30327 |
| 7,603,346 | B1 * | 10/2009 | Depelteau | G06F 17/30961 |
| 8,959,118 | B2 * | 2/2015 | Anderson | G06F 17/30091 |
| | | | | 707/736 |
| 2009/0012976 | A1 * | 1/2009 | Kang | G06F 12/0246 |
| 2010/0082664 | A1 * | 4/2010 | Odaira | G06F 17/30327 |
| | | | | 707/769 |
| 2013/0138679 | A1 * | 5/2013 | Kim | G06F 17/30979 |
| | | | | 707/765 |
| 2013/0290384 | A1 * | 10/2013 | Anderson | G06F 17/30091 |
| | | | | 707/822 |
| 2013/0318126 | A1 * | 11/2013 | Graefe | G06F 17/30327 |
| | | | | 707/797 |

* cited by examiner

*Primary Examiner* — Debbie Le
(74) *Attorney, Agent, or Firm* — Sterne, Kessler, Goldstein & Fox P.L.L.C.

(57) ABSTRACT

Existing algorithms to build balanced tree structures ("b-trees") compare a data element (e.g., a key) to be inserted with the data elements that have already been inserted to find the correct position to insert the data element. Additionally, the algorithms balance and/or rebalance the b-tree when any individual node gets over-filled. As part of this balancing, data elements stored in the various nodes are moved to other nodes. These operations can incur both time and resource costs. We propose an algorithm to build a b-tree in a bottom up manner and a technique to modify trees built using the aforementioned algorithm so that they are balanced. We also propose a method to allow for adding more data into the thus-built b-tree as long as it follows a certain set of pre-conditions.

14 Claims, 17 Drawing Sheets

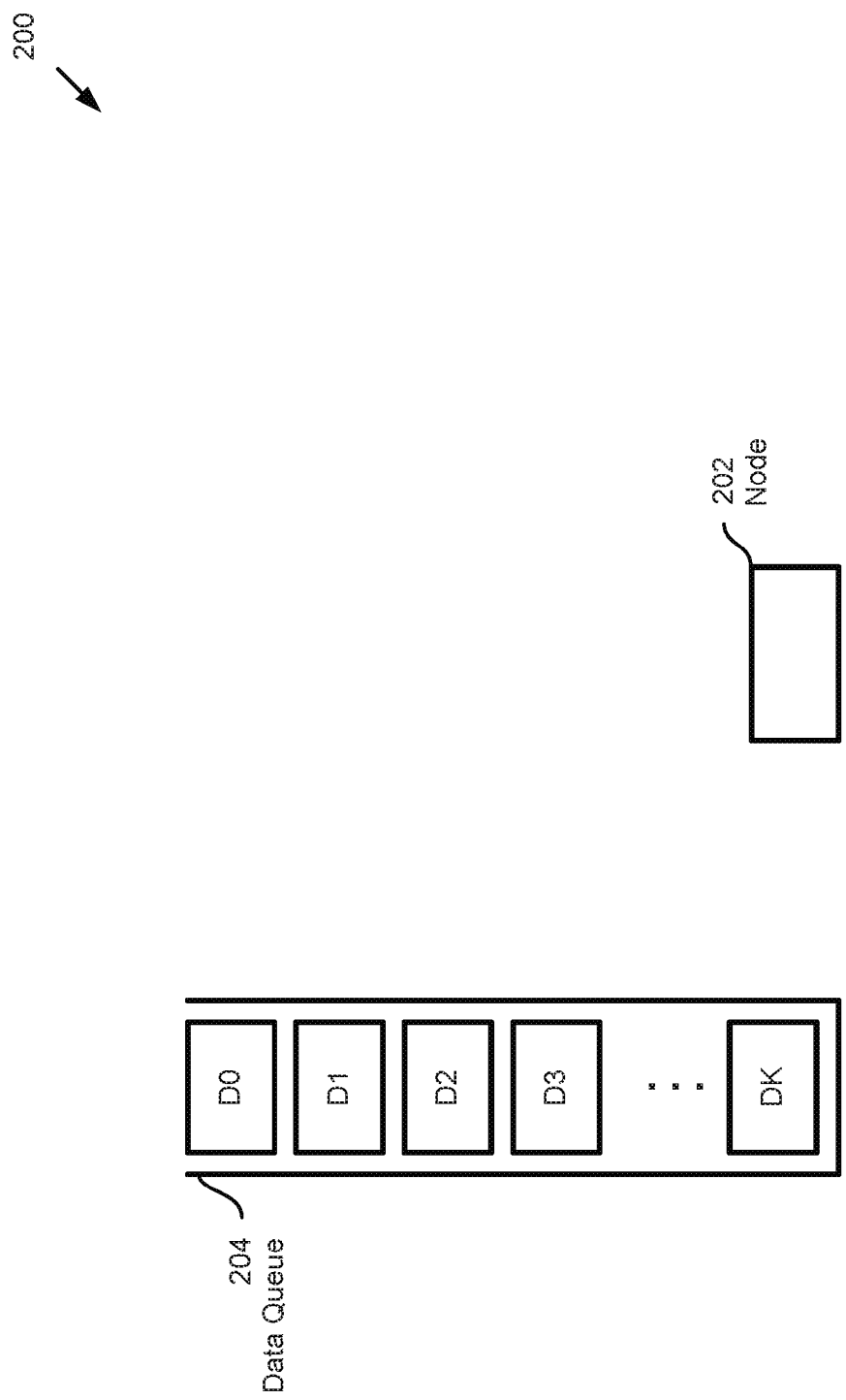

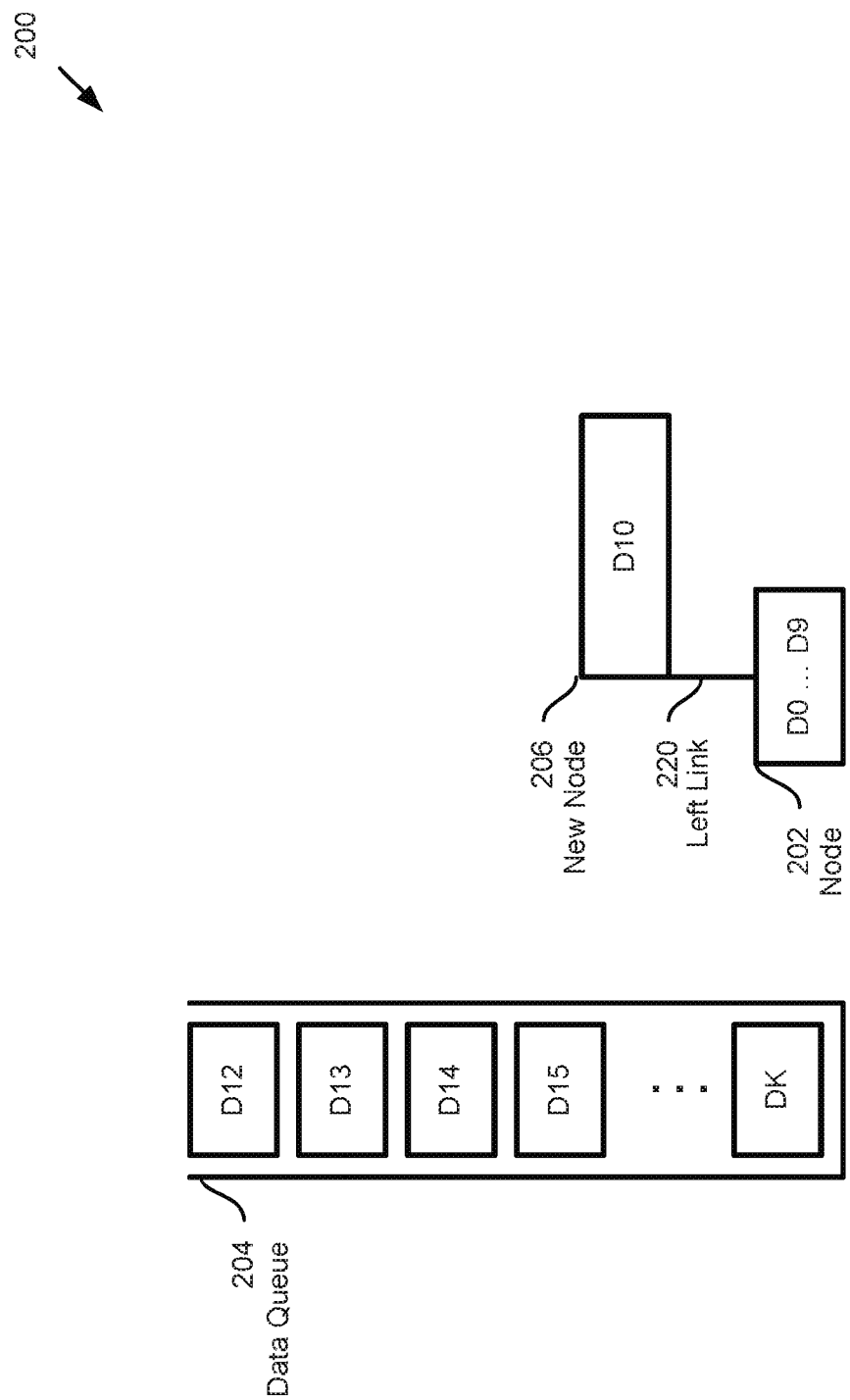

900

```
┌─────────────────────────────┐
│ Remove data elements used for│
│ balancing the b-tree from end│ ─ 902
│ node until a node with more  │
│ than one data element is     │
│ encountered.                 │
└─────────────────────────────┘
              │
              ▼
┌─────────────────────────────┐
│ Re-insert the removed data   │ ─ 904
│ elements into the b-tree     │
└─────────────────────────────┘
              │
              ▼
┌─────────────────────────────┐
│ Insert new data elements into│ ─ 906
│ b-tree                       │
└─────────────────────────────┘
              │
              ▼
┌─────────────────────────────┐
│ Re-balance b-tree            │ ─ 908
└─────────────────────────────┘
```

APPEND-ONLY B-TREE CURSOR

CROSS-REFERENCE TO RELATED APPLICATIONS

This application claims priority to co-pending U.S. patent application Ser. No. 14/140,643 filed on Dec. 26, 2013, the entire contents of which is herein incorporated by reference.

BACKGROUND

Tree structures can be used to store data in an ordered fashion. For instance, one kind of tree structure is a balanced tree or "b-tree." B-trees comprise a number of nodes organized along a parent-child relationship. In general, parent nodes will store data (or pointers and/or links to data) having a particular value and link to a number of "children" nodes that also store data (or, again, links to data) having a particular value. At leaf level, the nodes will store data. Typically, a given parent node will have a "left" child that stores values less than the smallest value stored by the parent and a number of "right" children, each corresponding to a subset of values in parent, that store data having values greater than the greatest value in that particular subset in the parent. Consider, for instance, a simple b-tree having three nodes. If the parent node stores data with a value of 2, then the left child node might store data with a value of 1 and the right child node might store data with a value of 3. When a tree has both its left arm and right arm populated (and any associated sub-arms) the tree is said to be "balanced."

Existing algorithms to build b-trees require comparing a data element (e.g., a key) to be inserted with the data elements that have already been inserted to find the correct position to insert the data element. Additionally, the b-tree needs to be balanced and/or rebalanced when any individual node gets over-filled. As part of this balancing, data elements stored in the various nodes must be moved to other nodes. All of these operations can incur both time and resource costs. It is, therefore, better to minimize these operations as much as possible.

BRIEF DESCRIPTION OF THE DRAWINGS

The accompanying drawings are incorporated herein and form a part of the specification.

FIGS. 2A-2F are example diagrams conceptually depicting a b-tree at various points during its construction according to embodiments.

FIG. 9 is a flowchart depicting a method of undoing finalization of a b-tree according to various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for storing data in a database using a tiered index architecture.

Figure 1:
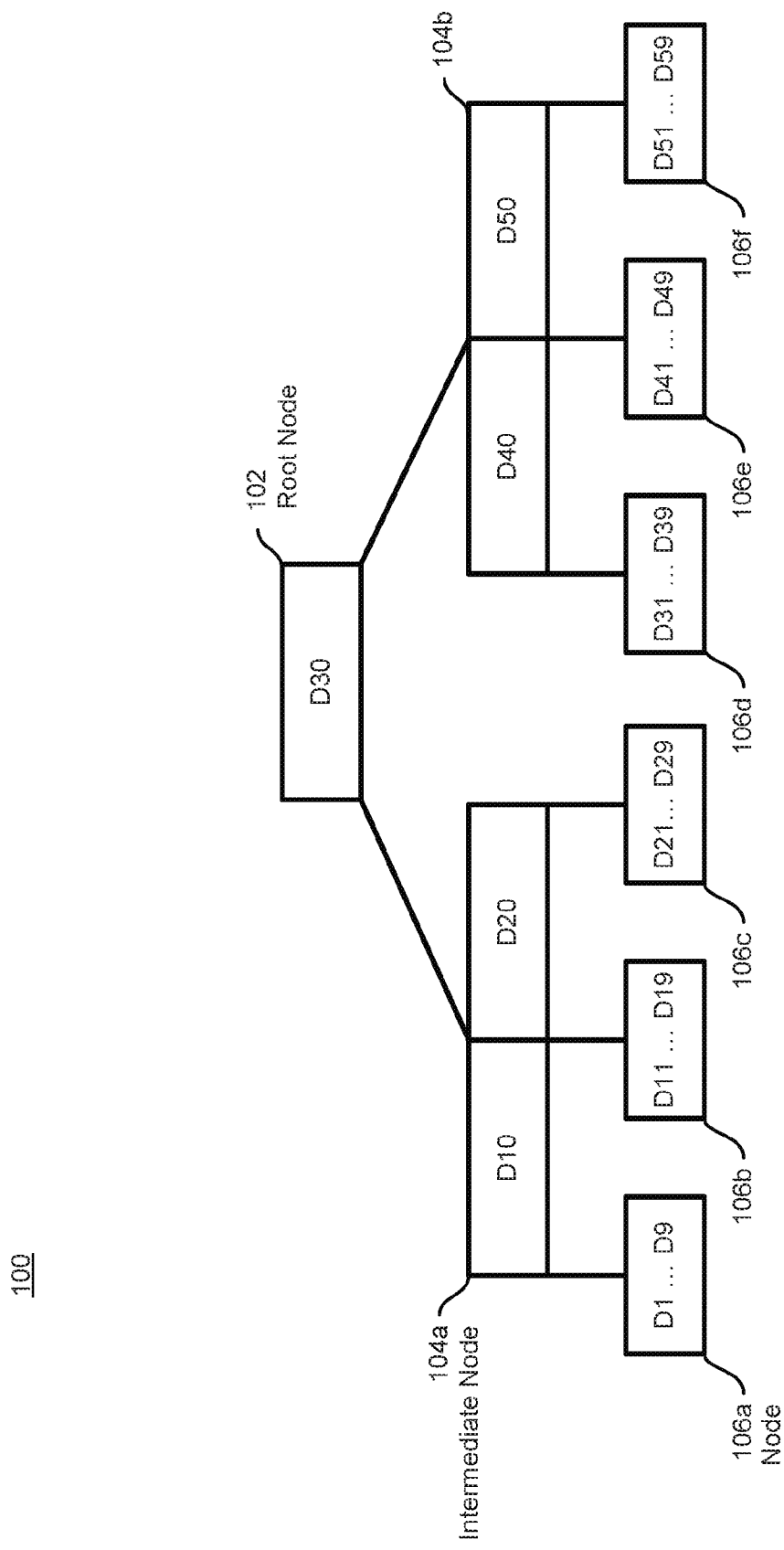
FIG. 1 is an example diagram depicting the structure of a b-tree according to various embodiments.

FIG. 1 depicts a simple general purpose tree structure 100 according to various embodiments. As shown, the tree structure 100 comprises a number of different nodes including a root node 102, intermediate nodes 104a and 104b (collectively referred to herein as "intermediate nodes 104"), and several leaf nodes 106a-f (collectively referred to herein as "leaf nodes 106"). Each of the nodes may be associated with a block of data that is configured to store a number of keys or data elements.

Tree structures such as tree structure 100 can be organized as balanced trees (also known as "b-trees"). B-trees are ordered in a specific way. For instance, if tree structure 100 were organized as a b-tree, root node 102 would comprise a block of data storing one or more data elements. Each of the data elements may be a pair of data comprising a value associated with that data element and a so-called "right link" to another node and/or sub-tree. Additionally, each node may include a "left link" that links to another node and/or sub-tree.

In general the nodes and/or sub-trees linked to by the right link of a particular data element contain values that are greater than the value of the particular data element. For instance, as shown in FIG. 1, data element D30 contains a right link to intermediate node 104b. Thus, it can be assumed that the values stored in the block associated with node 104b (and all of its associated sub-nodes) are greater than the value associated with data element D30.

In contrast, a node's left link will link to a node and/or sub-tree having values that are less than the smallest value stored in a particular node. For instance, FIG. 1 depicts root node 102 having a left link to intermediate node 104a. It may, therefore, be assumed that the values stored in node 104a (i.e., the values associated with D10 and D20) are less than the value associated with D30, which is the smallest data element stored in root node 102.

The relationship between nodes continues as you traverse down the tree 100. For instance, node 104a contains a left link to node 106a. Node 106a contains data elements with values that are less than the value of data element D10. Similarly, data element D10 contains a right link to node 106a. As shown, node 106a contains values that are greater than the value of the data element D10.

As briefly discussed above, existing algorithms to build balanced b-trees can prove a drain on resources in terms of time and in terms of hardware requirements. For instance, in order to determine where a particular data element (e.g., a key) should be inserted into a b-tree, it should be first determined where it fits into the established order. This is done by traversing the tree and comparing the value of the data element to the value of the data elements stored in the tree. For large b-trees, this can be rather time consuming.

Another step that must be performed in order to manage b-trees is to balance the b-tree when any node gets over-filled. For instance, some schemes might require nodes to remain at least half-full. To accomplish this balancing, data elements are moved from node to node and new nodes are created. Again, this can be rather time consuming and resource intensive. Additionally, some standard balancing algorithms result in a b-tree with nodes that are at least half full, but not entirely full. This is not the most efficient use of memory.

A better way to manage b-trees may be to eliminate or, at the very least, to reduce or even minimize these time-consuming steps.

One way the time-consuming steps can be eliminated and/or reduced is to institute one or more additional policies such as:

(1) pre-sort the data to be inserted into the b-tree so that it is in a particular order (e.g., ascending). In this way, any new data element is guaranteed to be "next" in line from the data elements already in the b-tree; and/or (2) relax (or eliminate) any requirement that nodes be at least half full.

With such additional policies, the b-tree can be built using a "bottom-up" approach. To use the bottom-up approach, the nodes of the b-tree are prefilled to full capacity in a bottom up manner.

This begins by inserting data elements into an initial leaf node until it is full. When a leaf node is full, the next data element can be added to the leaf node's parent node. If the parent node does not exist, then a new node can be created as the leaf node's parent and the next data element inserted therein.

Once a data element is added to any level other than the leaf, a new node should be created at the leaf node level. This new leaf node can then be filled with the subsequent data elements. This process can continue until the data elements in the input are filled into a node.

Once the data elements are filled into the appropriate nodes, the b-tree can be balanced. This is done by determining whether there are any non-leaf nodes that do not have a right child. If they do not, then a right child or children can be created using data elements evicted from full nodes and inserted into the new child or children. This action can create almost empty nodes that contain one data element (key) and that are used for balancing the b-tree.

When new data elements need to be inserted into the b-tree following balancing, the balancing process must be reversed. To do so, the data elements used for balancing the b-tree are removed from the b-tree until a node containing more than one data element is reached. Once a node containing more than one data element is reached, the removed keys can then be inserted into the b-tree in the manner described above. After the removed data elements are re-inserted, the new data elements can be added in the same way described above. After the new data elements are added, the b-tree can be re-balanced.

There are several benefits to building a b-tree this way. First, the process may not involve any comparisons between data elements or keys while inserting keys into the b-tree. This makes the process of building the b-tree faster. Second, no b-tree nodes need to be split in order to balance a tree. Accordingly, there is not unnecessary data movement as a part of intermediate balancing. Finally, data in all but the right most arm of the b-tree is densely packed achieving maximum compression, and hence reducing input/output cost incurred during querying the b-tree.

FIGS. 2A-2E are a diagrams conceptually depicting a b-tree 200 at various points during its construction according to embodiments. It is noted that embodiments are not limited to examples of FIGS. 2A-2E.

As shown, in FIG. 2A, the b-tree can initially begin as a single node 202. Node 202 may be associated with a particular data block that has the capacity to store a number of data elements. For instance, in the examples that follow, leaf nodes are depicted as having a capacity to store 10 data elements, but the capacity need not be so limited. Indeed, in practice, nodes might have the capacity to store thousands of data elements. FIG. 2A also depicts a data queue 204 containing data elements D1 to DK, which have been pre-sorted in ascending order, however the b-tree need not be so limited. In fact, according to various embodiments the data elements to be stored in b-tree 200 may be sorted in any order (e.g., descending, etc.).

Figure 2B:
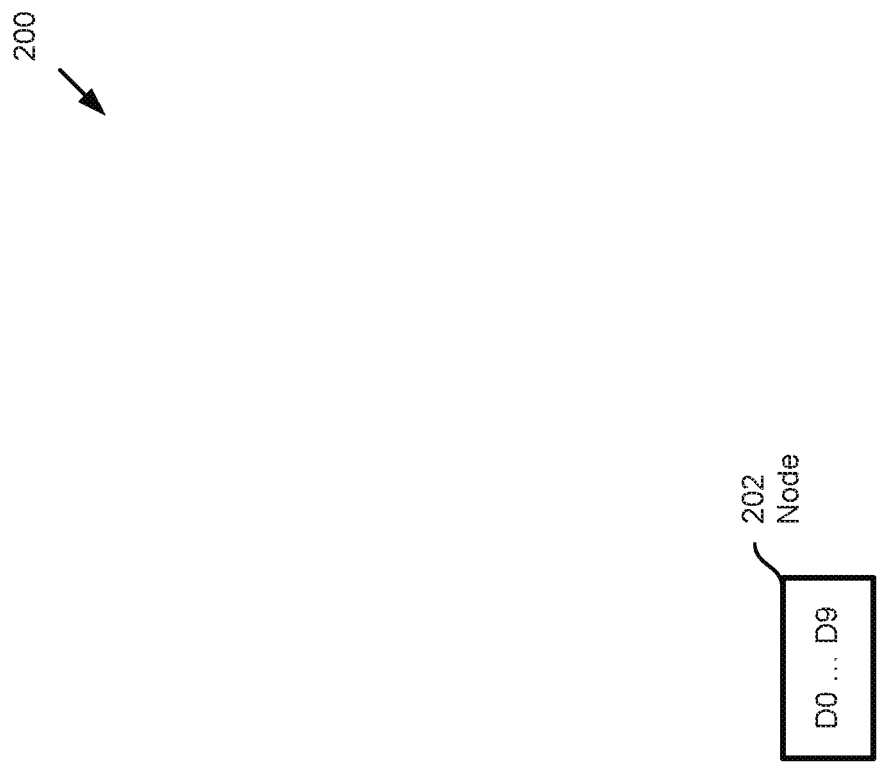

FIG. 2B depicts the b-tree 200 after node 202 has been filled to capacity with 10 data elements (i.e., data elements D0 to D9). As shown, the data elements can be added to the node 202 in sequential order such that the lowest value data element (D0 in this example) is in the "left" position of the node 202 and the largest value data element (D9 in this example) is added to the right-most position in the node 202. Since, as discussed above, node 202 has a capacity to hold 10 data elements, the node 202 is now at capacity. Accordingly, at this point, there is no room to store the next data element D11 in node 202. A new node (e.g., node 206) needs to be created to store the next data element D11. This is shown in FIG. 2C.

As shown in FIG. 2C, a new node 206 has been created as an intermediate node. Additionally, a left link 220 has been created linking node 206 to the initial leaf node 202. According to various embodiments, intermediate nodes (that is, non-leaf nodes) such as node 206 may have the capacity to store fewer data elements than the leaf nodes. However, this certainly need not be the case. Indeed, in some embodiments, nodes have the capacity to store the same number of data elements and in other embodiments, intermediate nodes can store more data elements than the leaf nodes. However, for the purposes of the example processes described with respect to FIGS. 2A-2F, leaf nodes will have a capacity to store 10 data elements and intermediate nodes will have the capacity to store only two data elements. Once node 206 is created, the next data element (here, data element D10) can be is inserted into the left most position of the new node 206.

Figure 2D:
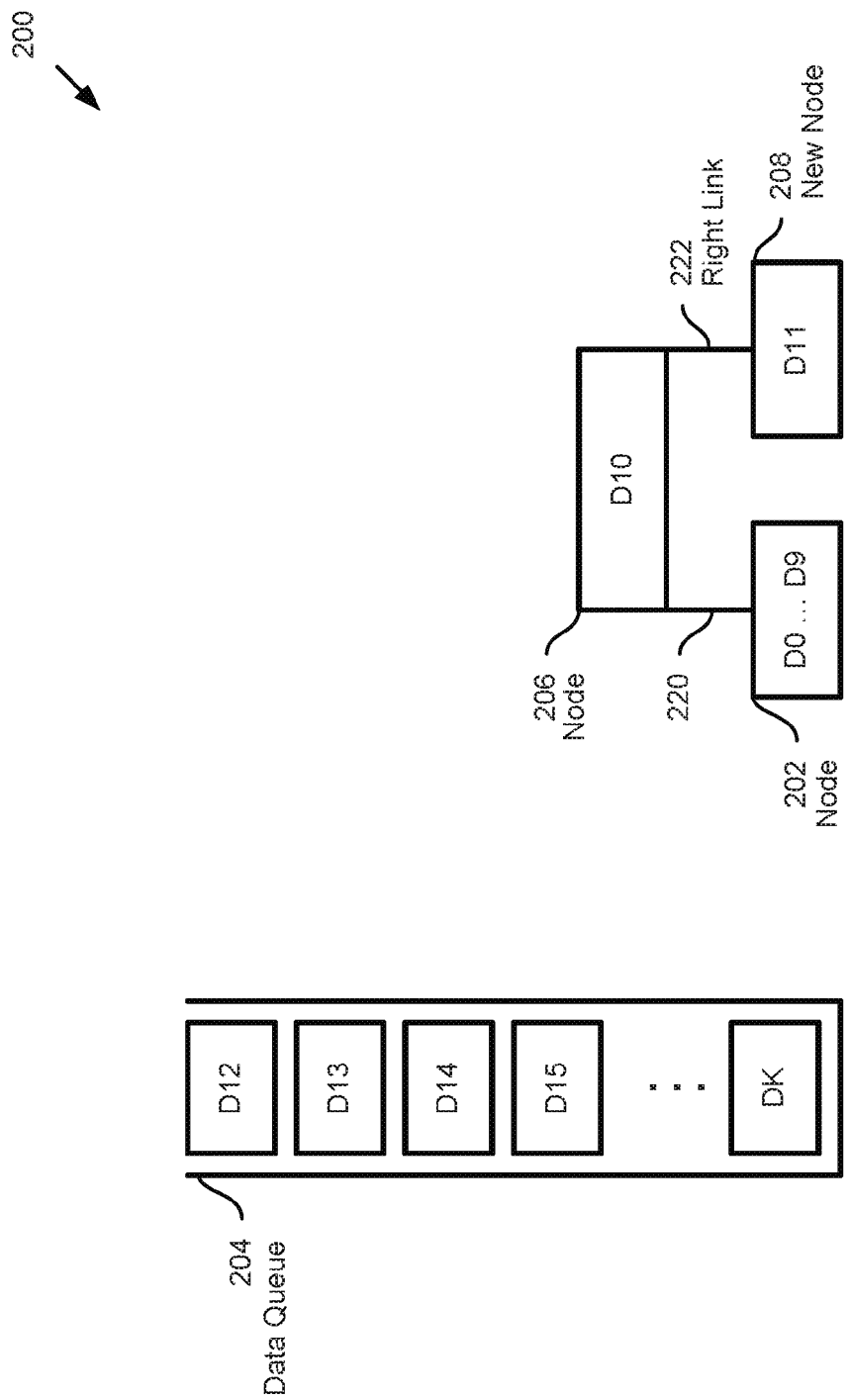

After data element D10 is inserted into the left-most position of node 206, a new leaf node is created to begin storing the next data elements. This process is depicted in FIG. 2D. As shown in FIG. 2D, new node 208 is been created as a child/leaf node of node 206. Additionally, node 208 is right linked to data element D10 via link 222. The next data element from the data queue 204 can now be stored in the new node 208 beginning at the left position. As shown in FIG. 2D, this begins with data element D11.

Figure 2E:
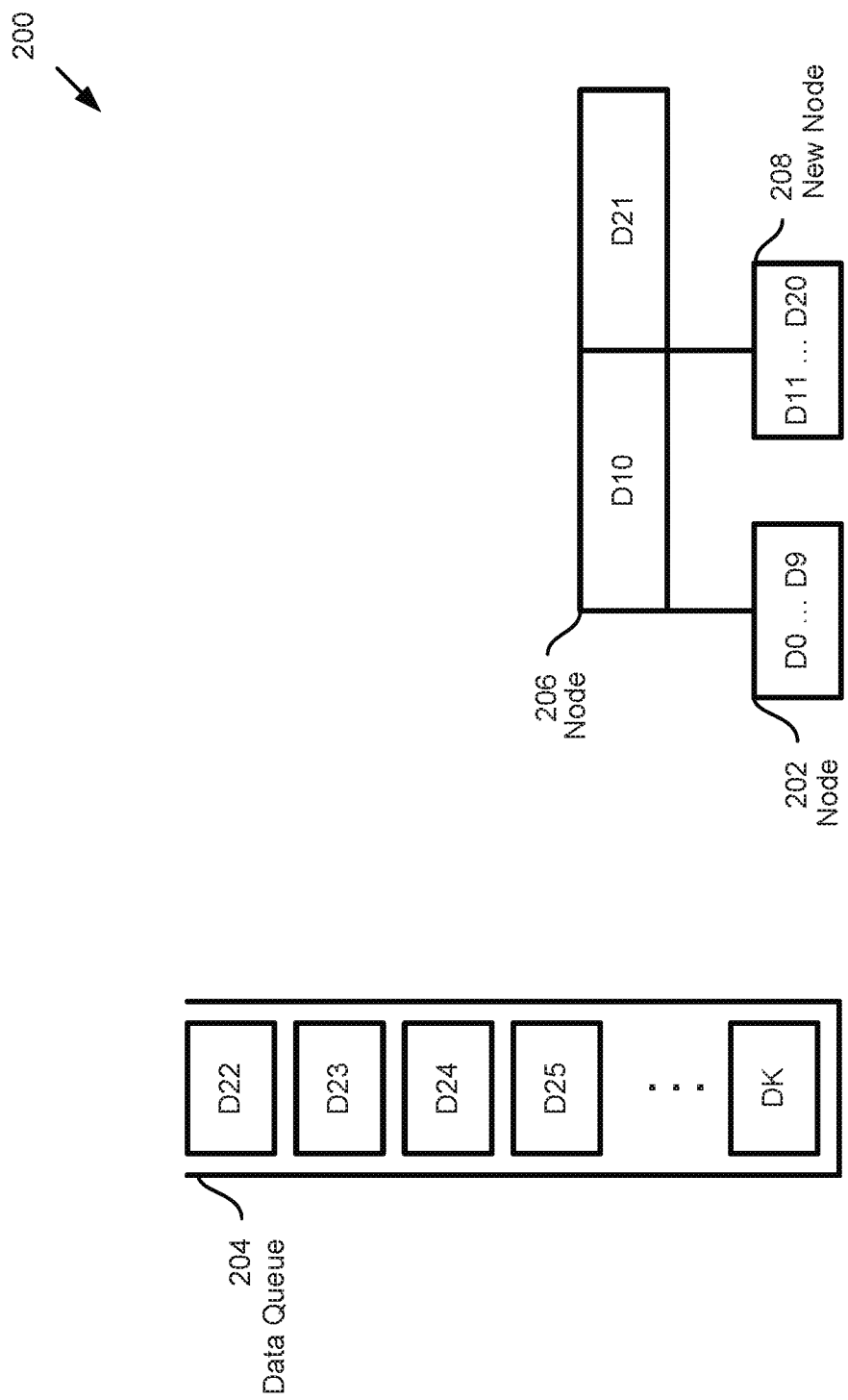

As shown in FIG. 2E, the new node 208 has been filed with data elements D11 to D20 bringing it to capacity. Accordingly, the next data element (in this case D21) must be added to new node and the process can continue.

Figure 2F:
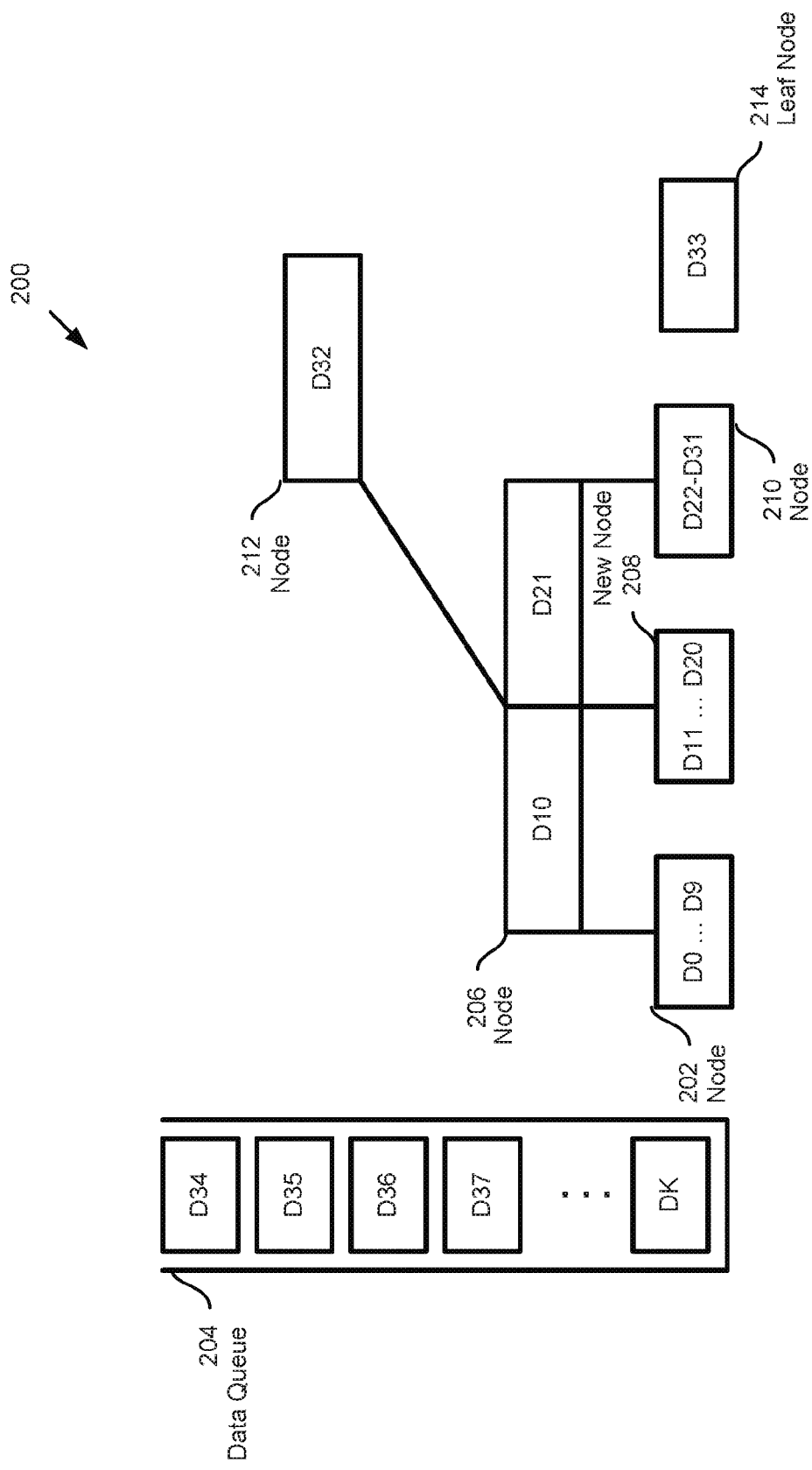

FIG. 2F depicts b-tree 200 later in the process of its construction. As shown in FIG. 2F, an additional node 210 has been added as a right link to data element D21 and subsequently filled with data elements D22-D31. Accordingly, the next data element (D32) cannot be stored in node 210. However, since in this example intermediate node 206 can only hold two data elements, the next data element cannot be stored in that node either. Thus, a new node 212 must be created at the next level. Data element D32 can then be inserted node 212. After data element D32 has been inserted into node 212, a new leaf node 214 can be created to store the next data element (D33). In general, any time a data element is inserted into a non-leaf node, a new leaf node is the next node created. After node 214 is created, the process can continue as discussed with respect to FIGS. 2A-2F until the data elements in data queue 204 have been stored in the b-tree 200.

Figure 3:
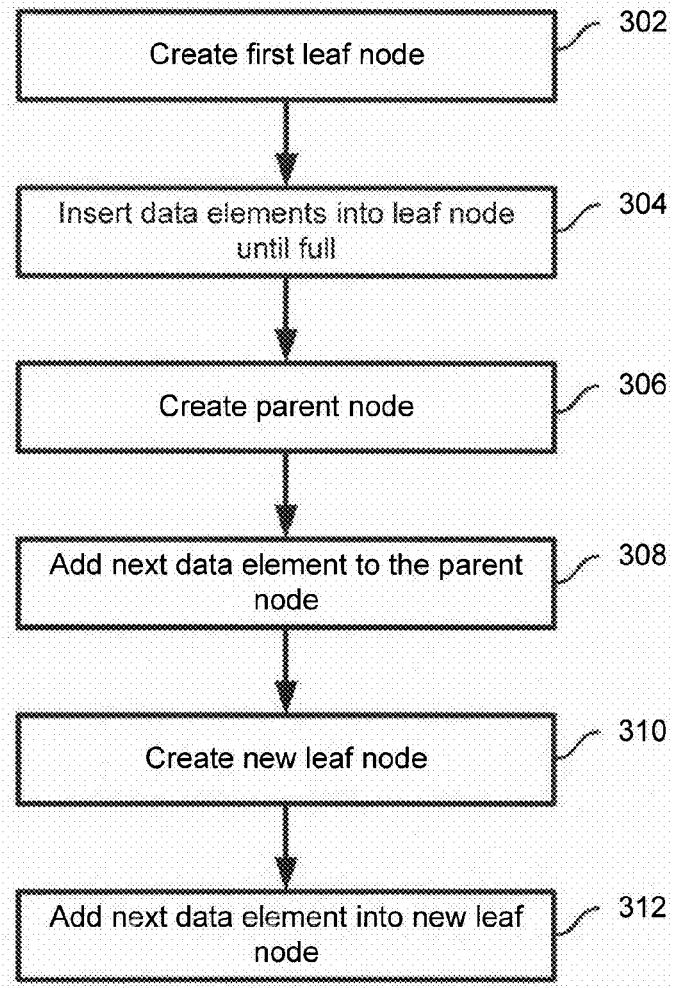
FIG. 3 is a flowchart depicting a method of constructing a b-tree according to various embodiments.

FIG. 3 is a flowchart depicting a method 300 of populating a b-tree 200 according to various embodiments. For ease of explanation, method 300 will be described with reference to b-table 200 depicted in FIGS. 2A-2F, however it need not be so limited.

According to the method a first leaf node 202 is created at step 302. According to various embodiments, the first leaf node 202 could have a capacity to hold a number of data elements. For instance, leaf node 202 is depicted in FIGS. 2A-F as having the capacity to store ten data elements. However, it should be understood that each node could have any capacity and still fall within the spirit and scope of the present description. Indeed, in practice, leaf nodes may have the capacity to store hundreds or thousands of data elements. At step 304, the leaf node 202 is filled with a number of data elements (e.g., D0 to D9) until it is full.

When the first leaf node 202 is full at step 304, a parent node 206 is created at step 306. The parent can left link 220 with the leaf node at this point thereby establishing the parent/child relationship between the two nodes 202 and 206. At step 308, the next data element (e.g., D10) is added to the lowest-value (i.e., "left-most") spot of parent node 206. If necessary, a new leaf node can then be created at step 210. In general, after adding a data element to a non-leaf node, a new leaf node is created.

At step 310, the new leaf node 208 is created and associated with data element D10 stored in parent node 206. The next data element and or elements can then be added to the new leaf node 208 at step 412. For instance, as shown in FIG. 2D, the new leaf node 208 can contain data elements (e.g., D11-D20) with values larger than the data element (D11) stored in node 206. This process may continue iteratively until the data elements in the data queue 204 are added to the b-tree 200 or until the parent node 206 is full. When the parent node is full, a new node needs to be added at a level up from the parent node to facilitate additional data elements being added to the b-tree 200. This process is described with respect to FIG. 4.

Figure 4:
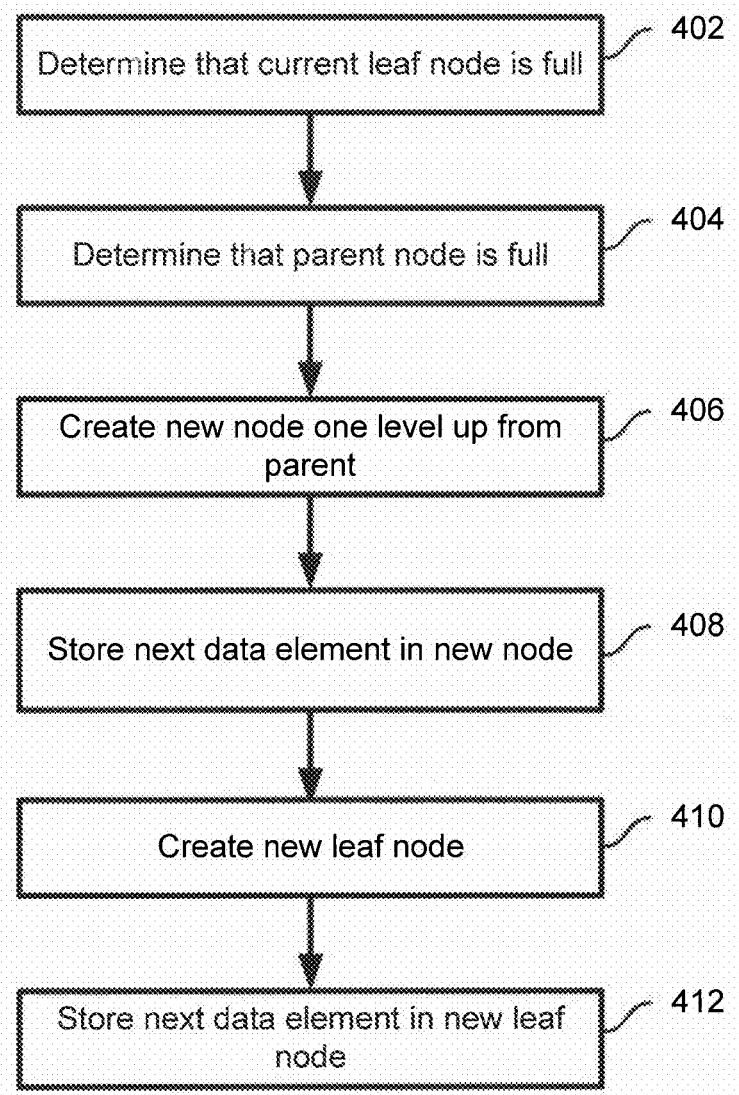
FIG. 4 is a flowchart depicting a method of populating a b-tree according to various embodiments.

FIG. 4 depicts a process 400 of adding data elements to a b-tree 200 when a leaf node and its parent node are both filled to capacity. For ease of explanation, method 400 will be described with reference to b-table 200 depicted in FIGS. 2A-2F, however it need not be so limited.

The method 400 begins at step 402 with a determination that the current leaf node (e.g., node 210) is filled to capacity. At step 404, the method 400 also determines that the parent node (e.g., node 206) is also filled to capacity. At this point a new node 212 can be created that is one level up from the parent node 206 at step 406. The new node 212 can be left linked with node 206. At step 408, the next data element D32 can be stored in the new node 212. Once the next data element D32 has been stored in the new node 212, a new leaf node 214 can be created to the right of node 212. In general, any time a new data element is stored in a non-leaf node (e.g., nodes 206 and 212) a new leaf node can be created according to various embodiments. At step 412, the next data element and/or elements can be stored in the newly created leaf node 214. New data elements may then be added to the b-tree 200 in the manner consistent with FIGS. 2A-2F and method 300 of FIG. 3. This process can be repeated each time a new non-leaf node needs to be created.

Trees constructed according to the methods outlined above may have several problems with them once they are constructed. Namely, they may be unbalanced. Consider, for instance, the alternate example representation of b-tree 500 depicted in FIG. 5A. B-tree 500 was constructed in accordance with the processes described above with respect to FIGS. 2A-4.

Figure 5A:
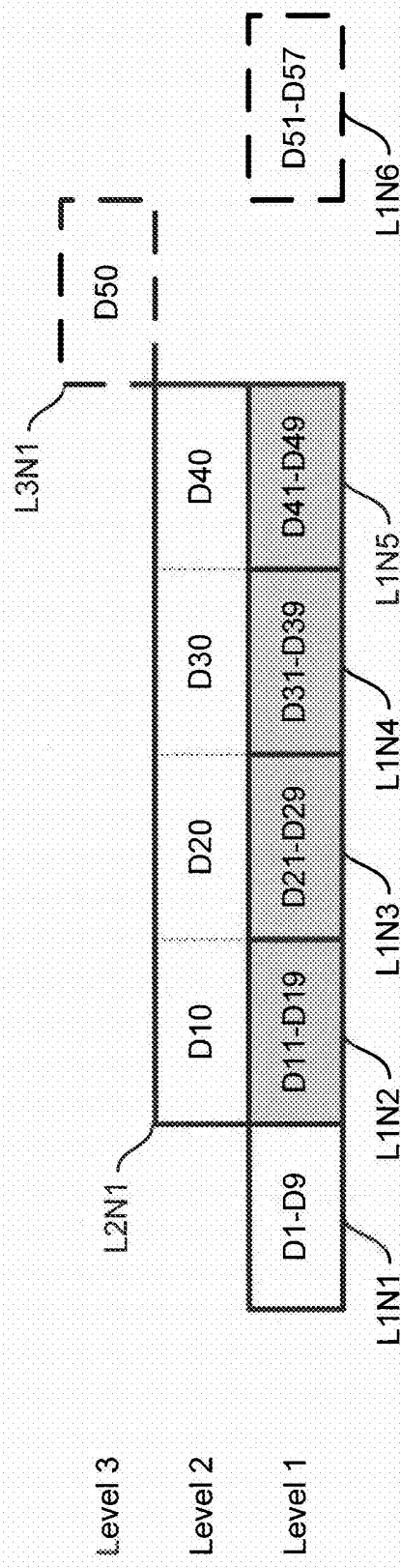
FIGS. 5A-5C are example diagrams conceptually depicting a b-tree at various points during its construction according to embodiments.

As shown in FIG. 5A, b-tree 500 comprises a number of nodes at three different levels. Each of the nodes is labeled according to the convention L[m]N[n] where "m" is the level number and "n" is the node number in that level. Accordingly, for instance, nod L1N1 is the first node in level 1 and L3N1 is the first node in level 3. Additionally, the shaded nodes (i.e., L1N2, L1N3, L1N4, and L1N5) are shaded to indicate that they are right linked with the data element in the node directly above them. For instance, node L1N2 is right linked (i.e., contains larger values than) with data element D10, which is stored in node L2N1 and node L1N3 is right linked with data element D20, etc.

As can be seen in FIG. 5A, b-tree 500 is not balanced. To be balanced, b-tree 500 should be finalized. The problems with b-tree 500 specifically, are that (a) node L1N6 is not linked with any other node and (b) node L3N1 has no right pointer.

Figure 5B:
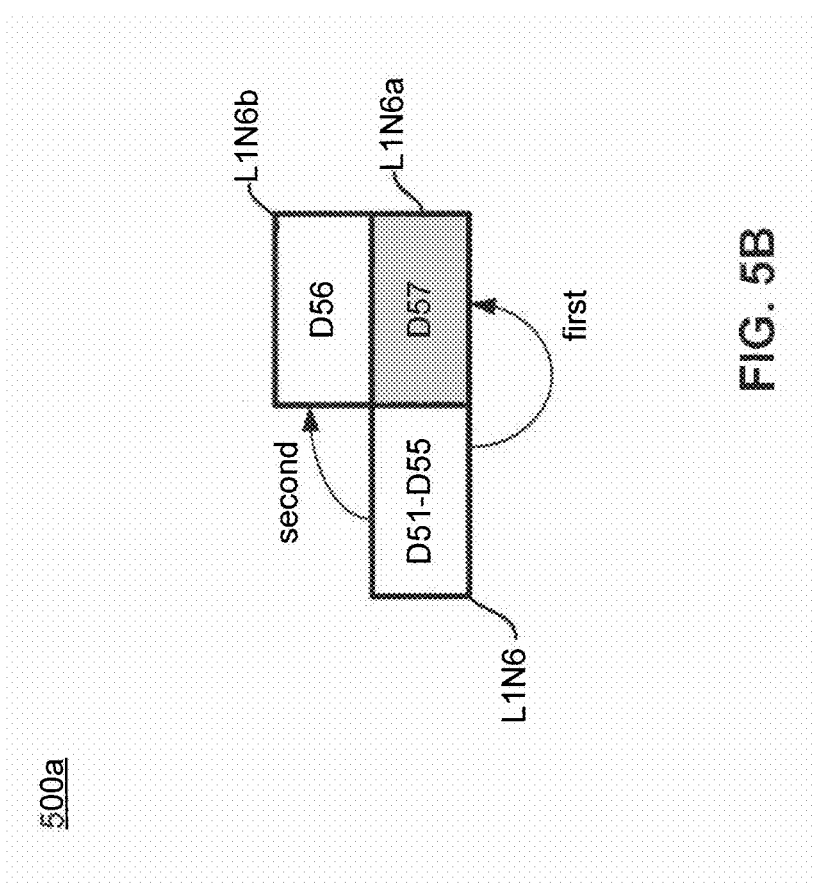
Figure 5C:
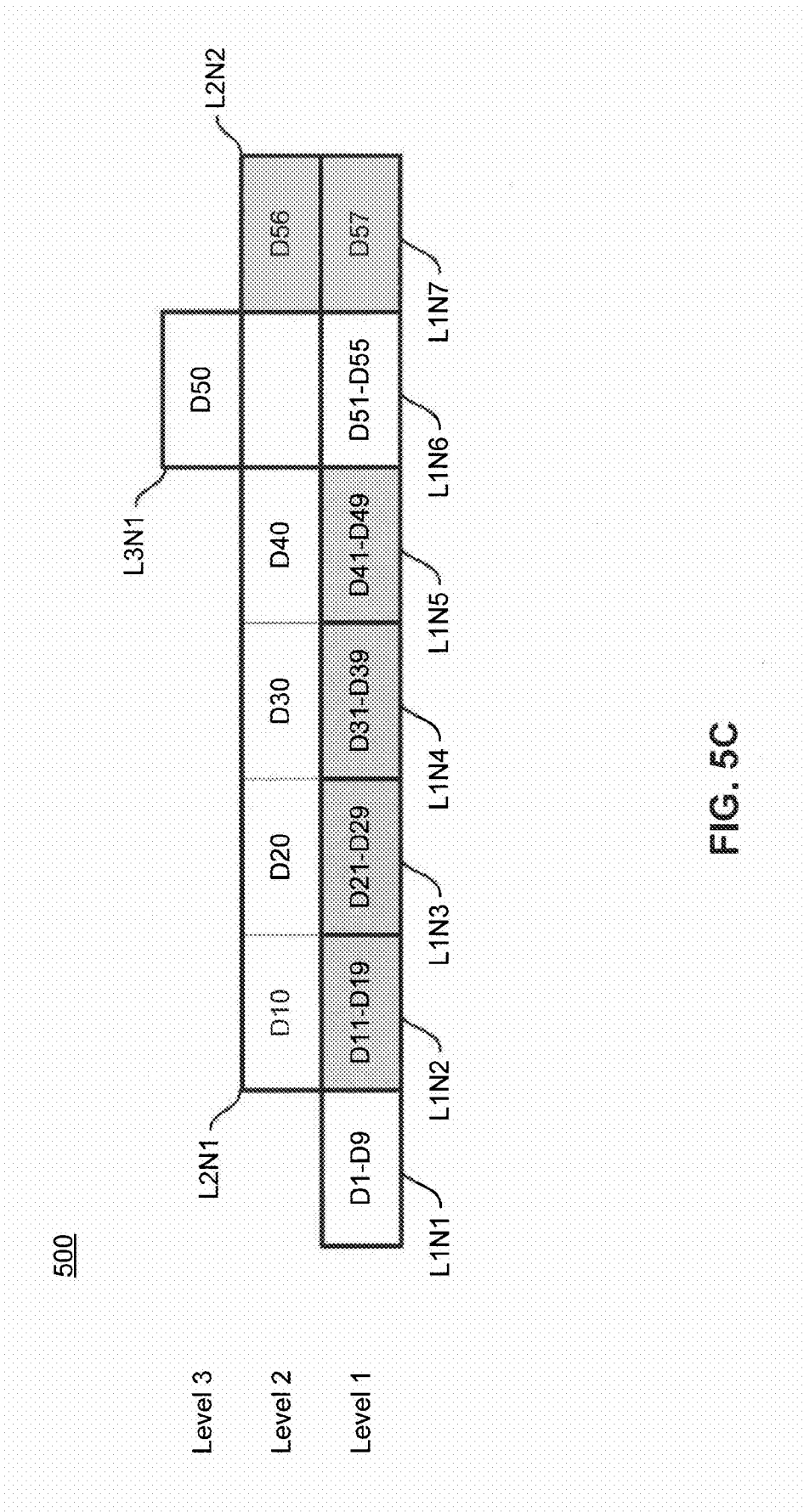

To fix this problem, a balancing binary tree can be constructed from node L1N6 by "evicting" the data elements one at a time. For instance, as shown in FIG. 5B, such a balanced b-tree 500a can be built by creating a new node L1N6a and the largest data element from L1N6, which in this case is D57. At this point, another node L1N6b can be created as a level 2 node (i.e., a level up from L1N6a) and the next highest data element can be evicted from node L1N6 and stored in the new level 2 node L1N6b. This balanced b-tree 500a can then be right linked with data element D50 as shown in FIG. 5C so that b-tree 500 is balanced. In general, the balanced b-tree should have a height one less than the node that of the node containing a data element that needs a right link. For instance, in FIG. 5A, node L3N1 is a level 3 node, accordingly, balancing binary 500a should have a height of 2 levels.

Figure 6:
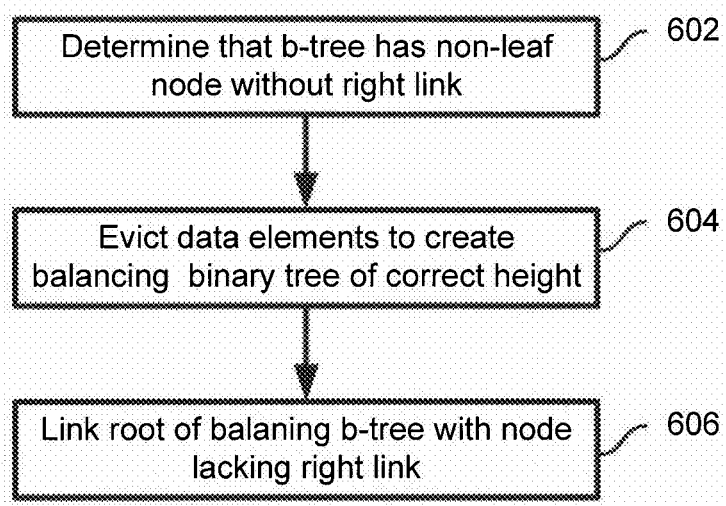
FIG. 6 is a flowchart depicting a method finalizing a b-tree according to various embodiments.

FIG. 6 depicts a method 600 of finalizing an unbalanced b-tree (e.g., b-tree 500) according to various embodiments. For ease of explanation, the method 600 will be described with reference to FIGS. 5A-5C. However, it should be understood that the method 600 is not limited to the particular embodiments depicted in FIGS. 5A-5C.

As shown in FIG. 6, method 600 begins at step 602 with a determination that the b-tree (e.g., b-tree 500) has a non-leaf node without a right link. For example, in the example depicted in FIG. 5A, the method 600 could determine that node L3N1 does not have a right link. At step 604, data elements can be evicted from the node containing the last data element in the b-tree 500 in order to construct a balancing binary tree 502a. For instance, in the example shown in FIGS. 5A-5C, node L1N6 contains the last data elements (D51-D57). Accordingly, data elements can be evicted from node L1N6 to create single element nodes L1N6a and L1N6b. These nodes can, in turn, be used to construct the balancing binary b-tree 500a depicted in FIG. 5B. Once the balancing binary tree 500a is constructed at step 604, it can be linked with the b-tree 500. For instance, the root of the balancing binary tree (i.e., node L1N6b in FIG. 5B) can be right linked with the node lacking a right link (i.e., node L3N1). Once this is done, the b-tree 500 will be balanced. It should be noted that in some instances, a b-tree may have more than one nodes without right links. Process 600 can be repeated iteratively until the b-tree is properly finalized. To summarize, as a part of finalizing the b-tree, we build a binary tree to be linked to the highest node missing a right link. The elements of this binary tree are obtained by evicting data from the already filled nodes in the b-tree.

Figure 7:
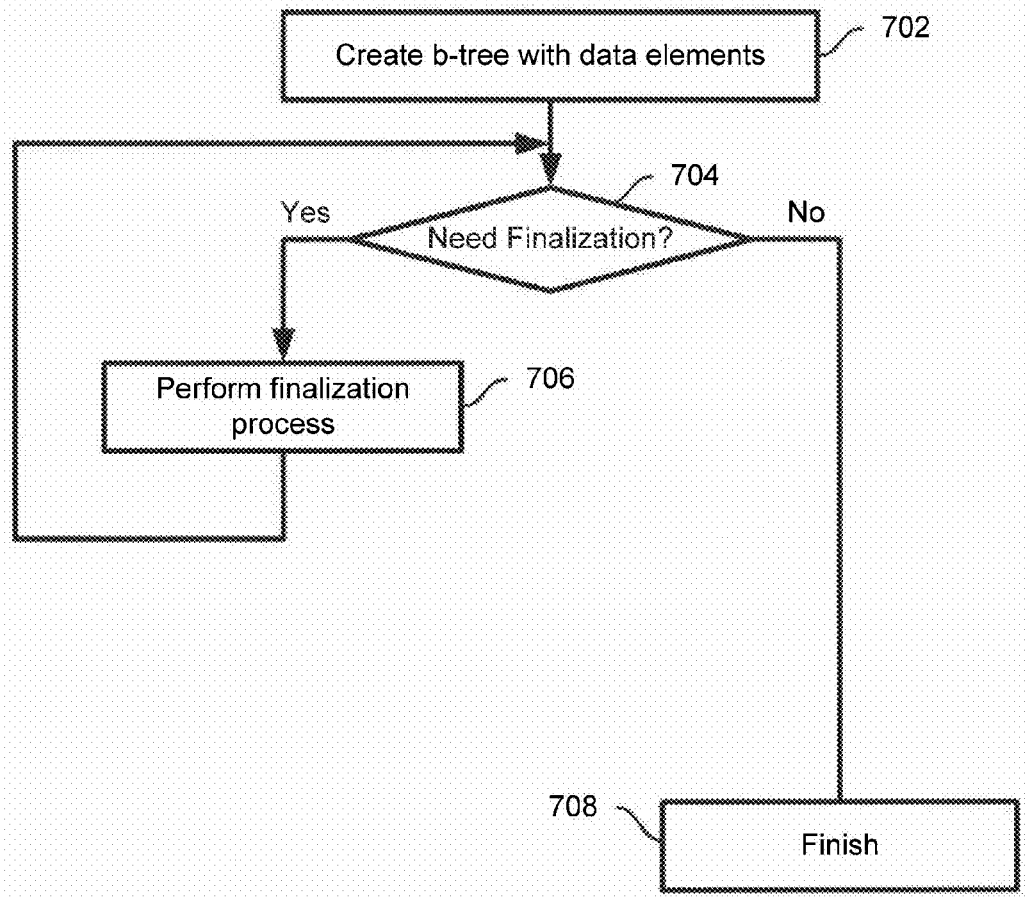
FIG. 7 is a flowchart depicting a method of constructing a b-tree according to various embodiments.

FIG. 7 is a flowchart depicting a method 700 of constructing and finalizing a b-tree (e.g., b-tree 500) according to various embodiments. The method 700 begins at step 702 with the creation of the b-tree 500 by filing it with data elements. The b-tree 500 can be constructed, for instance, according to methods 300 and 400 depicted above with respect to FIGS. 3 and 4. At step 704, the method 700 determines whether it is necessary to finalize the b-tree 500. The process 700 can determine whether a b-tree needs to be finalized by determining, for instance, if it contains nodes that have no right links (e.g., node L3N1 in FIG. 5A). In some instances, the b-tree 500 may contain no such nodes and may, therefore, already be balanced. If this is the case, then no finalization is necessary and the process can finish at step 708. However, if it is determined that the b-tree 500 contains nodes with no right links, then the b-tree 500 will need to be finalized and the method 700 can move to step 706, where the finalization process is performed. According to various embodiments, the finalization process may be performed using method 600 depicted in FIG. 6, above. After step 706, the method 700 loops back to 704 to determine whether there is any further need for finalization. If not, then the process ends at step 708. However, if there is, then the finalization process (e.g., method 600) is performed again.

Figure 8:
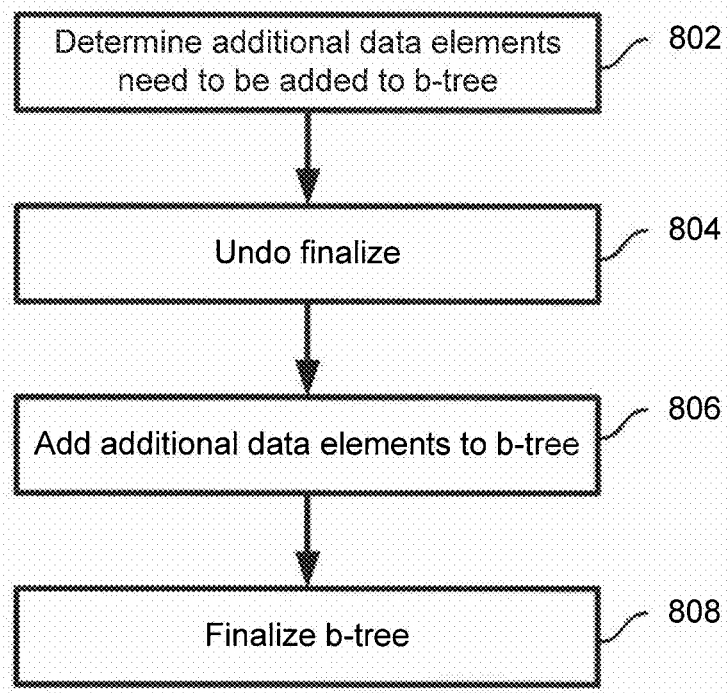
FIG. 8 is a flowchart depicting a method of adding elements to an extant b-tree according to various embodiments.

At some points, it may be necessary to add additional data elements to an already-created b-tree that has been created in accordance with the methods described above. FIG. 8 is a flowchart depicting a method 800 that can be used to add additional data elements to an extant b-tree according to various embodiments.

As shown in FIG. 8, the process 800 may begin by determining that additional data elements need to be added to the b-tree (e.g., b-tree 500). Once it is determined that additional data elements need to be added to the b-tree, then an undo finalize procedure is performed at step 804. The additional data element or elements can then be added to the b-tree at step 806. For instance, according to various embodiments, the processes outlined above with respect to FIGS. 2A-4 can be used to add the additional data element or elements to the b-tree. At step 808, the b-tree 500 is again finalized. Step 808 may be accomplished using the finalization procedures outlined above with respect to FIGS. 5A-6.

FIG. 9 is a flowchart depicting a method 900 of undoing the finalization of a b-tree according to various embodiments. For instance, method 900 could be used perform step 804 of method 800 in FIG. 8, above. For ease of explanation, method 600 will be described with reference to b-table 200 depicted in FIGS. 5A-5C, however it need not be so limited.

Method 900 begins at step 902 by removing the data elements used for balancing the b-tree 500. For instance, in the embodiment depicted in FIGS. 5A-5C, D57 and D56 can be removed from the B tree. This is done by iteratively removing data elements from the b-tree until we reach a node having more than one data element. At step 904, the removed data elements D57 and D56 are re-inserted into the b-tree 200 as described above with respect to FIGS. 2A-4. In this example, this would result in an un-balanced b-tree 500 as shown in FIG. 5A. That is, the b-tree at this point would have a node L3N1 without any right links. The new data elements (e.g., D58, etc.) can then be added to the B tree at step 906 according to the processes described above with respect to FIGS. 2A-4. At step 908, the b-tree 500 can be re-balanced if necessary.

Figure 10:
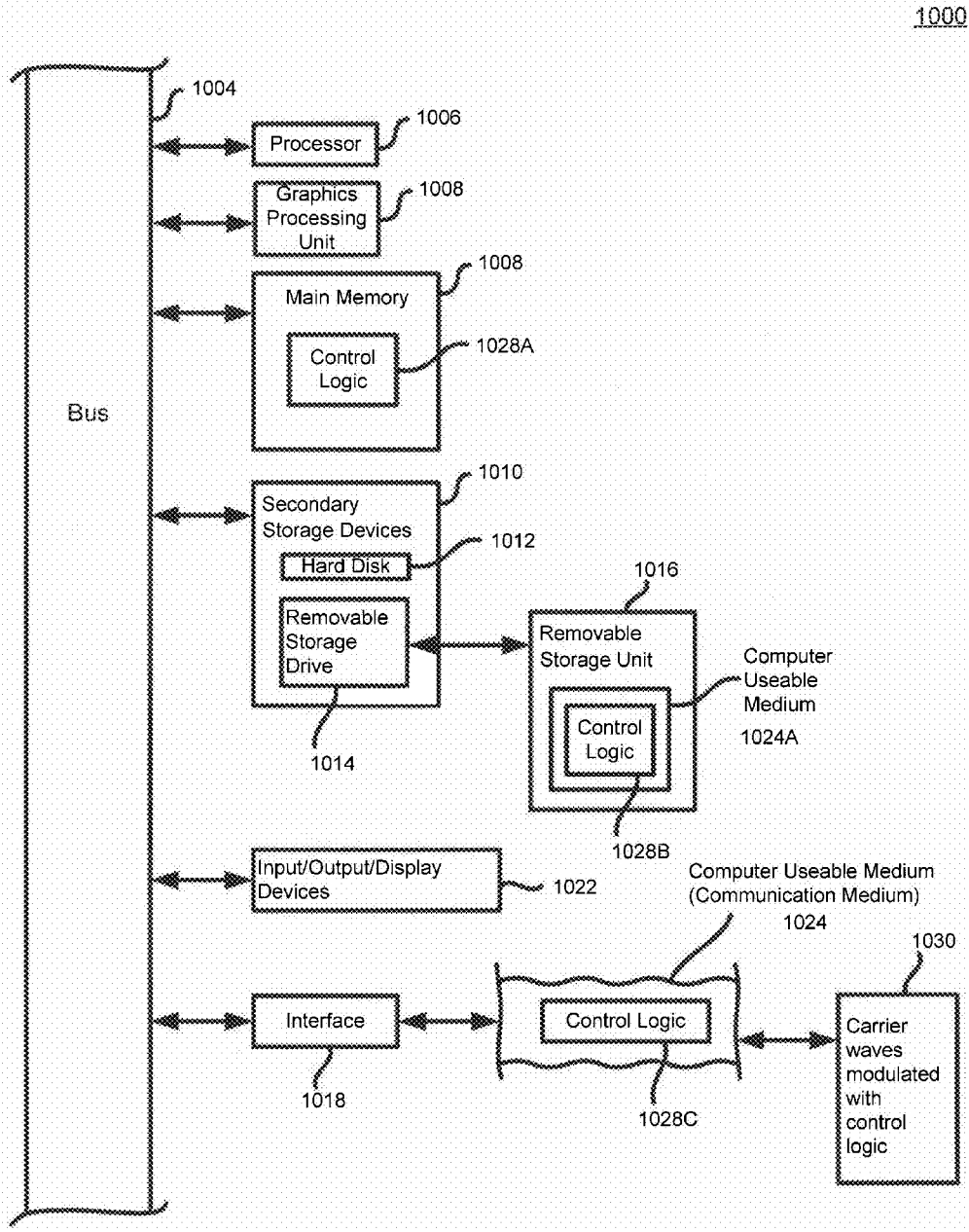
FIG. 10 is an example computer system useful for implementing various embodiments.

Various embodiments can be implemented, for example, using one or more well-known computer systems, such as computer system 1000 shown in FIG. 10. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may farther include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   receiving, by a controller, a data element for storage in a memory comprising a b-tree structure, wherein the data element is part of an ordered set of data elements;
   determining, by the controller, that a first node in the b-tree is filled to capacity and that a parent node of first node does not exist;
   creating the parent node and a second node;
   storing, by the controller, the data element in the parent node of the first node;
   associating, by the controller, the second node with the parent node, wherein the parent node exists on a level above the first node in the b-tree; and
   storing, by the controller, a subsequent data element in the second node.

2. The method of claim 1, wherein the first node is filled to capacity with a plurality of ordered data elements.

3. The method of claim 1, further comprising finalizing the b-tree after storing the subsequent data element in the second node.

4. The method of claim 3, wherein finalizing comprises:
   building a balancing binary tree from data elements already inserted into the b-tree.

5. The method of claim 3, further comprising:
   removing the data elements that form the balancing binary tree from the b-tree; and
   re-inserting the data elements that form the balancing binary tree into the b-tree.

6. The method of claim 5, further comprising adding an additional data element to the b-tree.

7. The method of claim 1, further comprising:
   receiving a second data element for storage in the b-tree;
   creating a second child node associated with the parent node; and
   storing the second data element in the second child node.

8. A system, comprising:
   a memory; and
   a controller configured to:
      receive a data element for storage in the memory comprising a b-tree structure, wherein the data element is part of an ordered set of data elements;
      determine that a first node in the b-tree is filled to capacity and that a parent node of first node does not exist;
      create the parent node and a second node;
      store the data element in the parent node of the first node;
      associate the second node with the parent node, wherein the parent node exists on a level above the first node in the b-tree; and
      store a subsequent data element in the second node.

9. The system of claim 8, wherein the first node is filled to capacity with a plurality of ordered data elements.

10. The system of claim 8, wherein the controller is further configured to finalize the b-tree after storing the subsequent data element in the second node.

11. The system of claim 10, wherein the controller is configured to finalize by:
    building a balancing binary tree from data elements already inserted into the b-tree.

12. The system of claim 3, further comprising undoing the finalizing.

13. The system of claim 12, wherein the controller is configured to undo the finalizing by:
    removing the data elements that form the balancing binary tree from the b-tree; and re-inserting the data elements that form the balancing binary tree into the b-tree.

14. A non-transitory computer readable medium containing computer instructions that, when executed by the computer, cause the computer to perform steps comprising:
   receiving a data element for storage in a memory comprising a b-tree structure, wherein the data element is part of an ordered set of data elements;
   determining that a first node in the b-tree is filled to capacity and that a parent node of first node does not exist;
   creating the parent node and a second node;
   storing the data element in the parent node of the first node;
   associating the second node with the parent node, wherein the parent node exists on a level above the first node in the b-tree; and
   storing a subsequent data element in the second node.

* * * * *

UNITED STATES PATENT AND TRADEMARK OFFICE
CERTIFICATE OF CORRECTION

PATENT NO. : 9,594,786 B2
APPLICATION NO. : 14/155315
DATED : March 14, 2017
INVENTOR(S) : Marathe et al.

Page 1 of 1

It is certified that error appears in the above-identified patent and that said Letters Patent is hereby corrected as shown below:

On the Title Page

Item [63], insert:
--Continuation of application No. 14/140,643, filed on Dec. 26, 2013.--

Signed and Sealed this
Twenty-ninth Day of November, 2022

Katherine Kelly Vidal
*Director of the United States Patent and Trademark Office*